3,160,417
ABUTMENT-TYPE SEAL FOR ROTARY ELEMENTS
Peter A. Mueller, 815 S. Scoville Ave., Oak Park, Ill.
Filed June 6, 1962, Ser. No. 200,524
3 Claims. (Cl. 277—40)

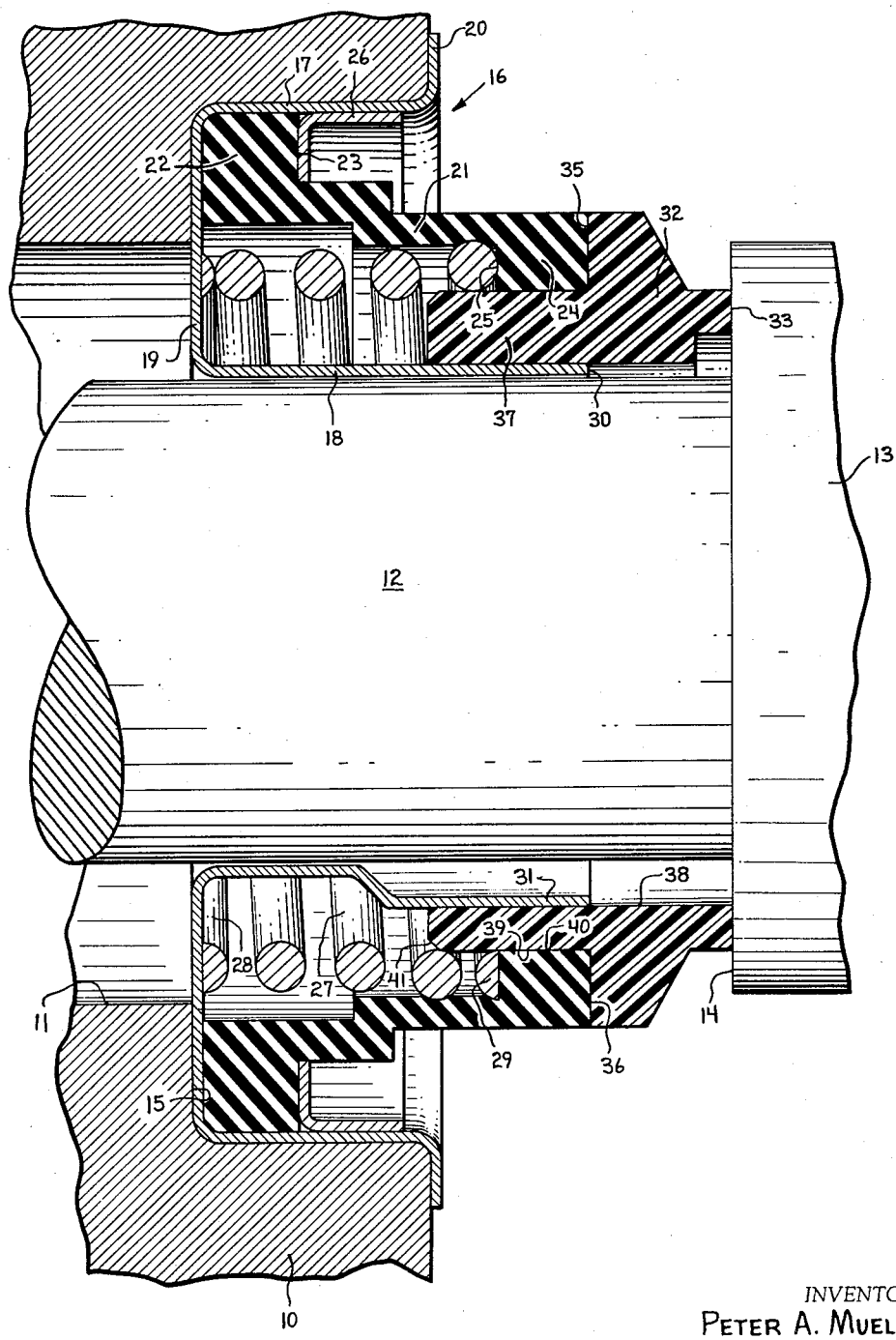

The present invention relates to improvements in abutment-type seals for rotary elements and particularly in the "package type" of seals for pump shafts or the like. Such seals are designed to prevent the passage of fluid between an abutment on a rotating shaft and a bearing housing in which the shaft is mounted, and it is highly desirable that the seal assemblies shall be so integrated, at the factory, that each such seal may be handled as a unit in the production of pump assemblies or similar devices, and that the parts of each seal assembly shall be firmly grouped so that the assembly may be handled quickly and relatively carelessly without fear of disintegration.

A primary object of the present invention, then, is to provide a seal assembly construction which will meet the above requirements and in which, although the bearing ring is resiliently urged away from the shell of the assembly, it will be firmly and effectively retained against accidental dislodgment from the assembly.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

The single figure is a longitudinal section, drawn to a highly enlarged scale, through a seal constructed in accordance with the present invention and operatively mounted between an abutment on a shaft and a bearing housing in which the shaft is supported.

Referring more particularly to the drawings, it will be seen that I have shown a bearing housing 10 having an opening 11 therein which is penetrated by a shaft 12 supported, at least in part, from a bearing (not shown) within the housing. Fixed to move with the shaft 12 is an abutment means 13 which may be integral with the shaft or may be a collar mounted thereon, but which presents a transaxial abutment surface 14 toward the bearing housing 10.

The bearing housing 10 is formed with a socket 15 concentric with, and enlarged with respect to, the opening 11. The seal of the present invention comprises a shell indicated generally by the reference numeral 16 and formed, preferably from sheet metal, to provide an outer perimetral wall 17, an inner peripheral wall 18 and a floor 19 joining the proximal ends of the walls 17 and 18. In the illustrated form of the invention, the distal end of the wall 17 is out-turned as at 20 to define a stop flange; and the entire shell is proportioned and designed to fit snugly and stationarily in the socket 15. The inner diameter of the wall 18 substantially conforms to the external diameter of the shaft 12, and is sleeved on said shaft with a slight clearance, as shown.

A boot 21 of rubber or similar material, which may be generally characterized as "rubberoid material," is provided at one end with a radially-outwardly thickened flange 22 which is received in the shell 16 to bear upon the floor 19 and whose external perimeter snugly fits the internal surface of the shell wall 17. The flange 22 thus provides a transaxial, distal face 23. At its opposite end, the boot is formed with a radially-inwardly thickened flange 24 which defines a proximal face 25 presented toward the floor 19.

An anchor ring 26 is received in the shell 16 to bear upon the face 23 of the flange 22 and thus to retain the proximal end of the boot 21 against movement away from the shell floor 19. The ring 26 may be riveted, welded or otherwise secured to the shell wall 17; but I prefer to make the anchor ring with a tight, press fit in the shell 16 so that said anchor ring will be frictionally retained in the shell to perform its function. This detail wholly eliminates the need for bonding, gluing or cementing the boot end to the shell which has been universally felt in all previously known seals of this character with which I am familiar.

Loosely surrounding the inner wall 18 of the shell 16 is a coiled spring 27, the proximal end 28 of which is seated on the shell floor 19 and the distal end 29 of which is confiningly engaged against the face 25 of the boot flange 24. Thus, the spring 27 resiliently tends to elongate the boot 21. It will be obvious, of course, that the internal diameter of the proximal portion of the boot 21 significantly exceeds the external diameter of the shell wall 18, so that the spring 27 is located between the boot and the shell wall 18.

The distal end 30 of the wall 18 is provided with one or more (preferably three) longitudinally-extending, radially-outwardly offset ribs 31 for a purpose which will appear.

A bearing ring 32 is formed at its distal end to provide a transaxial bearing surface 33 adapted to abut against the face 14 of the abutment 13. Said bearing ring is further formed to provide a shoulder 35 facing toward the shell floor 19 and projecting radially outwardly for sealing engagement with the distal end of the boot flange 24. An annular skirt 37 projects axially from the bearing ring 32, said skirt being formed with channels 38 for cooperative reception of the offset ribs 31 formed in the wall 18, whereby the bearing ring is held against rotation relative to the shell.

The internal diameter of the bearing ring 32 and of its skirt 37 substantially conforms to the external diameter of the distal portion of the shell wall 18; and the external surface 39 of said skirt is proportioned for snug, frictional reception in, and penetration through, the internal surface 40 of the flange 24. Upon inspection of the drawing, it will be readily perceived that the internal, equilibrium diameter of the spring 27, as indicated by those convolutions of the spring near its proximal end 28, is minutely less than the internal diameter of the flange 24, and therefore less than the external diameter of the skirt 37. Thus, when the ring 32 is pressed home, in the assembly of the seal, the proximal end portion of the skirt 37, after passing the flange 24, engages one or more of the convolutions of the spring 27 adjacent the distal end 29 thereof to expand said convolutions radially. To assist in accomplishing such expansion, the inner end of the skirt is preferably chamfered as at 41. Such expansion of the distal spring convolutions causes those convolutions frictionally to grip the inner end portion of the skirt 37, thus effectively retaining the bearing ring 32 against accidental dislodgment from the assembly and eliminating the need for bonding, gluing or cementing the ring 32 to the distal end of the boot.

Thus, the assembly is effectively integrated so that the seal assembly may be shipped and may be handled in completing organizations in which such seals are useful, without the necessity for the exertion of care to prevent dislodgment of the sealing ring, and so that its parts are effectively retained in their intended cooperative association through its operational life.

I claim as my invention:

1. An abutment-type seal for a rotational element comprising an annular shell formed to define an outer perimetral wall, an inner peripheral wall and a floor joining said walls, an annular, rubberoid boot having one end seated on said floor and closely fitting said outer wall but spaced outwardly from said inner wall, the other end of said boot having a radially-inwardly thickened flange, means disposed in said shell and engaging said boot to restrain the same against movement away from said floor, a coiled spring having one end seated on said floor and having its other end confined by engagement with the proximal surface of said flange, and a bearing ring separate from said boot and formed to provide, at one end, a transaxial bearing surface directed away from said shell floor, the other end of said bearing ring being formed to provide a skirt snugly sleeved on the distal end of said inner wall and snugly telescoped within said flange, said skirt penetrating said flange to enter said other end of said spring and having an external diameter slightly exceeding the equilibrium internal diameter of said other spring end.

2. An abutment-type seal for a rotational element comprising an annular shell formed to define an outer perimetral wall, an inner peripheral wall and a floor joining said walls, an annular, rubberoid boot having one end seated on said floor and formed to provide a radially-outwardly thickened flange closely fitting said outer wall but spaced outwardly from said inner wall, the other end of said boot having a radially-inwardly thickened flange, means disposed in said shell and engaging the distal face of said first-named flange to restrain the same against movement away from said floor, a coiled spring loosely sleeved on said inner wall, having its proximal end seated on said floor and having its distal end confined by engagement with the proximal surface of said second-named flange, and a bearing ring separate from said boot and formed to provide, at one end, a transaxial bearing surface directed away from said shell floor, the other end of said bearing ring being formed to provide a skirt snugly sleeved on the distal end of said inner wall and snugly telescoped within said second-named flange, said skirt extending beyond said second-named flange to enter said other end of said spring and having an external diameter slightly exceeding the equilibrium internal diameter of said other spring end.

3. For use with a shaft, a stationary bearing housing for said shaft, and an abutment fixed to rotate with said shaft, a seal comprising a shell formed to provide an outer perimetral wall fixedly receivable in a concentric socket in such a bearing housing surrounding such a shaft, an inner peripheral wall substantially conforming to such a shaft in diameter, and a floor joining said walls at their proximal ends, an annular, rubberoid boot having its proximal end seated on said floor, said boot end having an internal diameter significantly greater than the external diameter of said inner wall and having a radially-outwardly thickened flange peripherally snugly fitting within said outer wall and presenting a distal surface away from said floor, an anchor ring fixedly seated in said shell and bearing on said distal flange surface to restrain the same against movement away from said floor, a coiled spring loosely sleeved about said inner wall and having its proximal end seated on said floor, the distal end of said boot having a radially-inwardly thickened flange presenting a proximal surface toward said floor and confiningly engaging the distal end of said spring, and a bearing ring separate from said boot and formed at one end to provide a transaxial bearing surface adapted to bear against such an abutment, said bearing ring further being formed adjacent its same end to provide a transaxial surface engageable with the distal end of said boot, and a skirt on said bearing ring extending from said last-named surface toward said floor, said skirt penetrating between the distal end of said inner wall and the internal periphery of said radially-inwardly-thickened flange and entering the distal end of said spring, the external diameter of said skirt significantly exceeding the equilibrium diameter of said distal end of said spring.

References Cited by the Examiner
UNITED STATES PATENTS

| | | | |
|---|---|---|---|
| 2,881,015 | 4/59 | Wahl | 277—96 X |
| 2,892,642 | 6/59 | Payne | 277—42 |
| 2,899,219 | 8/59 | Payne | 277—43 |

EDWARD V. BENHAM, *Primary Examiner.*

SAMUEL ROTHBERG, *Examiner.*